US012095141B2

(12) United States Patent
Wu et al.

(10) Patent No.: US 12,095,141 B2
(45) Date of Patent: Sep. 17, 2024

(54) ELECTRONIC DEVICE AND ANTENNA MODULE

(71) Applicant: WISTRON NEWEB CORPORATION, Hsinchu (TW)

(72) Inventors: Meng-Kai Wu, Hsinchu (TW); Hong-Jun Jian, Hsinchu (TW); Hsieh-Chih Lin, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 176 days.

(21) Appl. No.: 18/064,987

(22) Filed: Dec. 13, 2022

(65) Prior Publication Data

US 2023/0411825 A1 Dec. 21, 2023

(30) Foreign Application Priority Data

Jun. 17, 2022 (TW) .................................. 111122539

(51) Int. Cl.

| | |
|---|---|
| ***H01Q 1/22*** | (2006.01) |
| ***H01Q 1/48*** | (2006.01) |
| ***H01Q 3/18*** | (2006.01) |
| ***H01Q 5/30*** | (2015.01) |
| ***H01Q 9/04*** | (2006.01) |
| ***H01Q 13/10*** | (2006.01) |

(52) U.S. Cl.

CPC ............. *H01Q 1/2266* (2013.01); *H01Q 1/48* (2013.01); *H01Q 3/18* (2013.01); *H01Q 5/30* (2015.01); *H01Q 9/0457* (2013.01); *H01Q 13/10* (2013.01)

(58) Field of Classification Search

CPC .......... H01Q 1/2266; H01Q 1/48; H01Q 3/10; H01Q 3/18; H01Q 5/30; H01Q 9/0457

See application file for complete search history.

(56) References Cited

U.S. PATENT DOCUMENTS

| | | | | |
|---|---|---|---|---|
| 10,498,041 | B1 * | 12/2019 | Lin ........................ | H01Q 13/16 |
| 11,171,409 | B2 | 11/2021 | Chen et al. | |

(Continued)

FOREIGN PATENT DOCUMENTS

| | | | |
|---|---|---|---|
| CN | 112751175 | A | 5/2021 |
| TW | 201613173 | A | 4/2016 |
| TW | 202130039 | A | 8/2021 |

*Primary Examiner* — Graham P Smith
*Assistant Examiner* — Amal Patel
(74) *Attorney, Agent, or Firm* — McClure, Qualey & Rodack, LLP

(57) ABSTRACT

An electronic device and an antenna module are provided. The electronic device includes a metal housing and the antenna module disposed. The metal housing has a slot, and the slot has an open end. The antenna module includes a carrier, a feeding element, a radiating element connected to the feeding element, and a grounding element. The radiating element is disposed on a first surface of the carrier. An orthogonal projection of the radiating element that is projected onto the metal housing at least partially overlaps with the slot. The grounding element includes a first grounding portion and a second grounding portion electrically connected to each other. The radiating element and the first grounding portion are spaced apart from each other by a first coupling gap, and the radiating element and the second grounding portion are spaced apart from each other by a second coupling gap.

17 Claims, 8 Drawing Sheets

(56) References Cited

U.S. PATENT DOCUMENTS

| | | | | |
|---|---|---|---|---|
| 2013/0050031 | A1* | 2/2013 | Zhu | H01Q 1/2266<br>343/702 |
| 2017/0309993 | A1* | 10/2017 | Tu | H01Q 13/10 |
| 2021/0359410 | A1* | 11/2021 | Li | H01Q 1/246 |

* cited by examiner

ELECTRONIC DEVICE AND ANTENNA MODULE

CROSS-REFERENCE TO RELATED PATENT APPLICATION

This application claims the benefit of priority to Taiwan Patent Application No. 111122539, filed on Jun. 17, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device and an antenna module, and more particularly to an electronic device and an antenna module capable of blocking noise and concentrating antenna radiation energy.

BACKGROUND OF THE DISCLOSURE

In the related art, housings of electronic devices (such as notebook computers) are often made with a metal texture to enhance aesthetic appearances. In this case, the housing of the electronic device is mostly made of metal, and only a small part thereof is made of non-metallic materials. Since the housing of the electronic device is mostly made of metal, the performance of an antenna module in the electronic device can be easily affected such that the communication quality of the electronic device is reduced.

Therefore, how to ensure that the antenna module has good performance in a metallic environment through an improvement in structural design, so as to overcome the above-mentioned deficiency, has become one of the important issues to be solved in the related field.

SUMMARY OF THE DISCLOSURE

In response to the above-referenced technical inadequacy, the present disclosure provides an electronic device and an antenna module capable of blocking noise and concentrating antenna radiation energy.

In one aspect, the present disclosure provides an electronic device, which includes a metal housing, a carrier, a feeding element, a radiating element, and a grounding element. The metal housing has a slot, and the slot has an open end. The carrier is disposed in the metal housing. The carrier has a first surface and a second surface that are opposite to each other, and has a third surface and a fourth surface that are opposite to each other. The first surface faces the slot, and the third surface and the fourth surface are located between the first surface and the second surface. The feeding element is disposed in the metal housing and is used to feed a signal. The radiating element is disposed on the first surface. An orthogonal projection of the radiating element that is projected onto the metal housing at least partially overlaps with the slot. The radiating element is connected to the feeding element. The grounding element includes a first grounding portion and a second grounding portion. The first grounding portion is disposed on the third surface, the second grounding portion is disposed on the fourth surface, the first grounding portion and the second grounding portion are electrically connected to each other, the radiating element and the first grounding portion are spaced apart from each other by a first coupling gap, and the radiating element and the second grounding portion are spaced apart from each other by a second coupling gap.

In another aspect, the present disclosure provides an antenna module. The antenna module is disposed in a metal housing, and the metal housing has a slot. The slot has an open end, a first closed end, and a second closed end. The open end is located between the first closed end and the second closed end. The antenna module includes a carrier, a radiating element, and a grounding element. The carrier is disposed in the metal housing. The carrier has a first surface and a second surface that are opposite to each other, and has a third surface and a fourth surface that are opposite to each other. The first surface faces the slot, and the third surface and the fourth surface are located between the first surface and the second surface. The radiating element is disposed on the first surface. An orthogonal projection of the radiating element that is projected onto the metal housing at least partially overlaps with the slot. The radiating element is connected to a feeding element, and a signal is fed into the radiating element through the feeding element. The grounding element includes a first grounding portion and a second grounding portion. The first grounding portion is disposed on the third surface, the second grounding portion is disposed on the fourth surface, and the first grounding portion and the second grounding portion are electrically connected to each other. The radiating element and the first grounding portion are spaced apart from each other by a first coupling gap, and the radiating element and the second grounding portion are spaced apart from each other by a second coupling gap.

Therefore, in the electronic device and the antenna module provided by the present disclosure, by virtue of "an orthogonal projection of the radiating element that is projected onto the metal housing at least partially overlapping with the slot" and "the first grounding portion and the second grounding portion being electrically connected to each other, the radiating element and the first grounding portion being spaced apart from each other by a first coupling gap, and the radiating element and the second grounding portion being spaced apart from each other by a second coupling gap," an operating frequency band generated by the antenna module of the electronic device can have multi-modal wideband characteristics.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
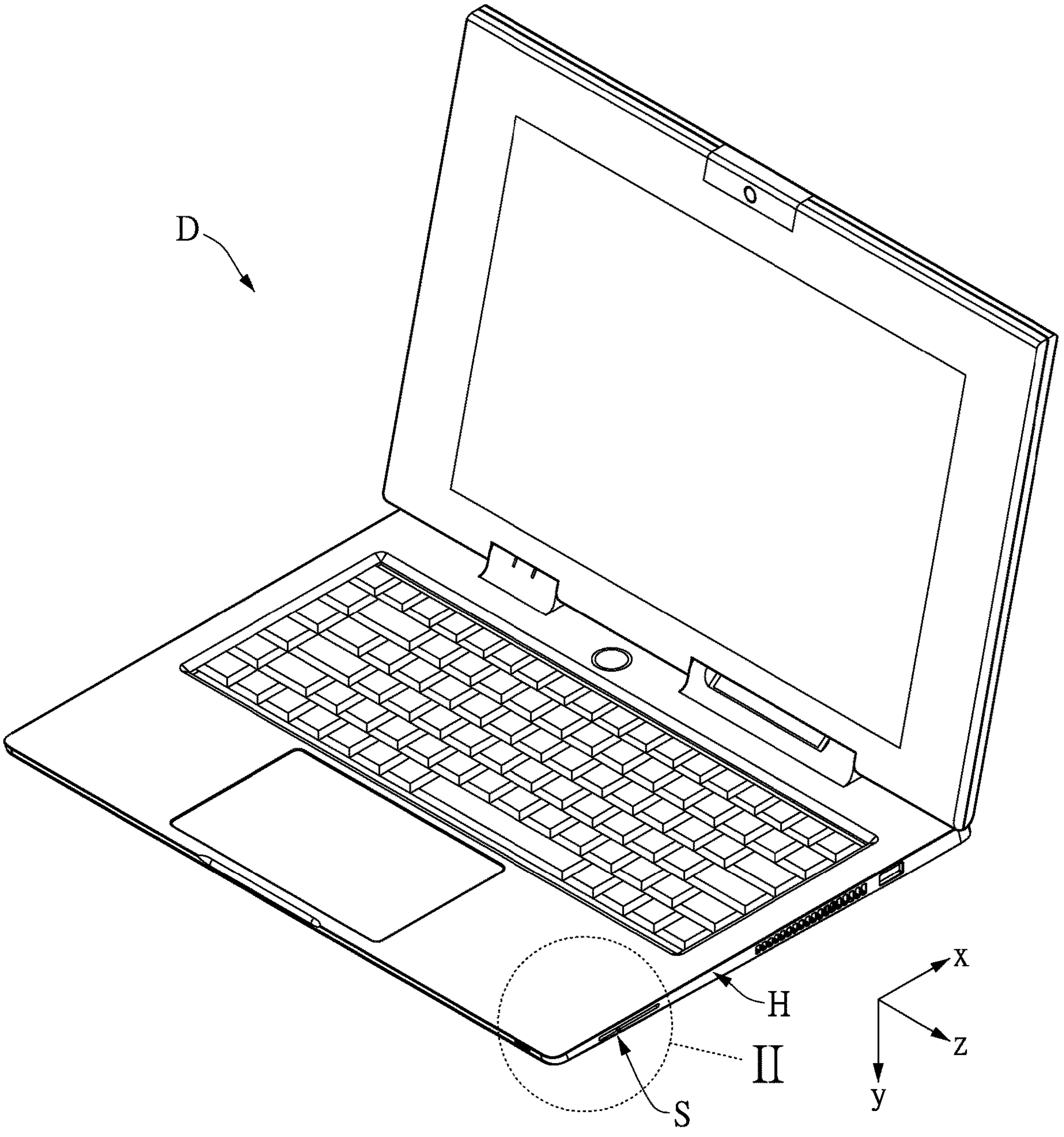
FIG. 1 is a schematic perspective view of an electronic device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In addition, the term "connect" or "connected" in the context of the present disclosure means that there is a physical connection between two elements, and the two elements are directly or indirectly connected. The term "couple" or "coupled" in the context of the present disclosure means that two elements are separate from each other and have no physical connection therebetween, and an electric field energy generated by one of the two elements excites an electric field energy generated by another one of the two elements.

EMBODIMENTS

Figure 2:
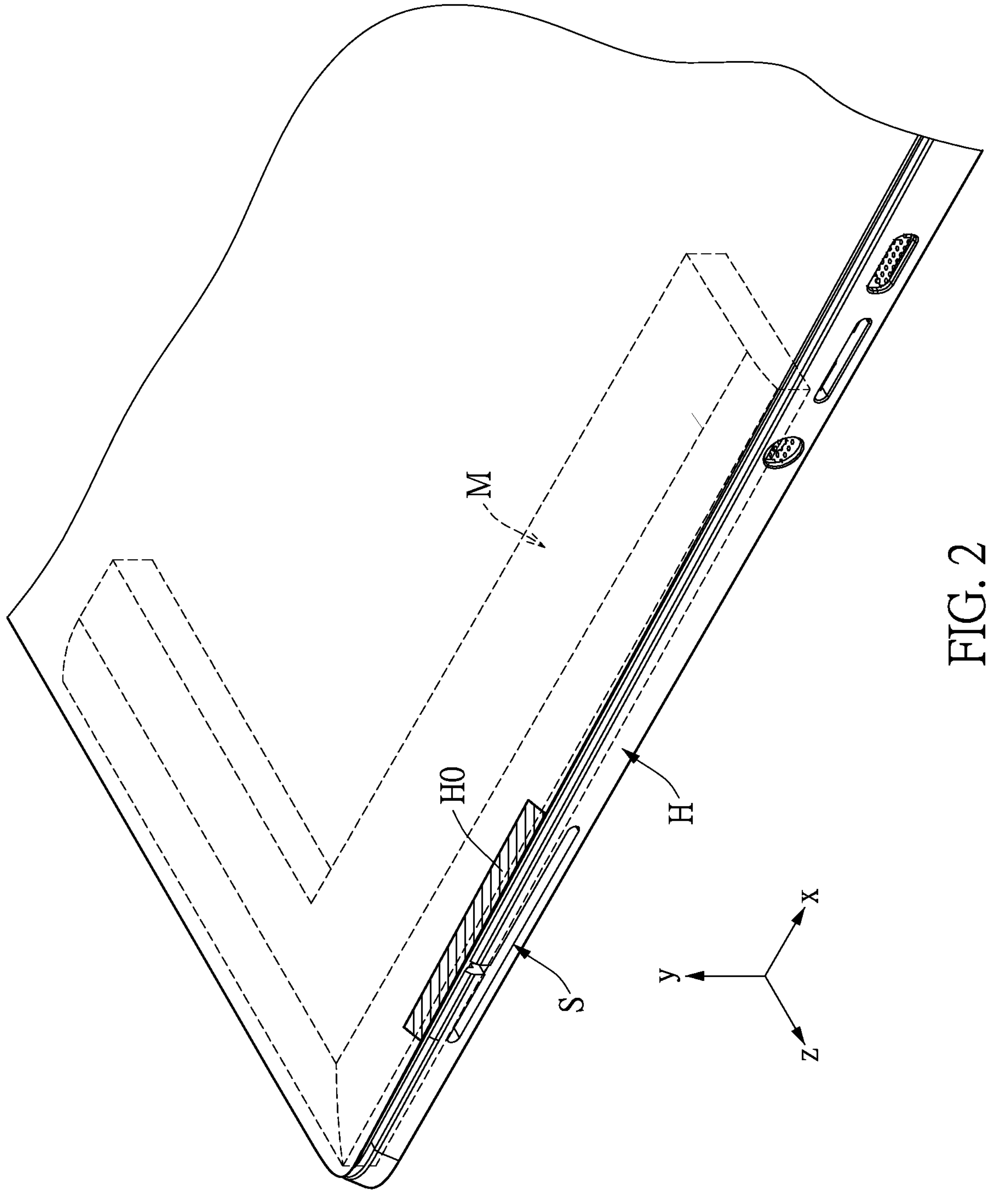
FIG. 2 is a schematic enlarged view of part II of FIG. 1.

Referring to FIG. 1 and FIG. 2, FIG. 1 is a schematic perspective view of an electronic device according to the present disclosure, and FIG. 2 is a schematic enlarged view of part II of FIG. 1. The present disclosure provides an electronic device D, and the electronic device D can be a notebook computer, but the disclosure is not limited thereto. The electronic device D includes a metal housing H and an antenna module M disposed therein, and the metal housing H has a slot S.

Figure 3:
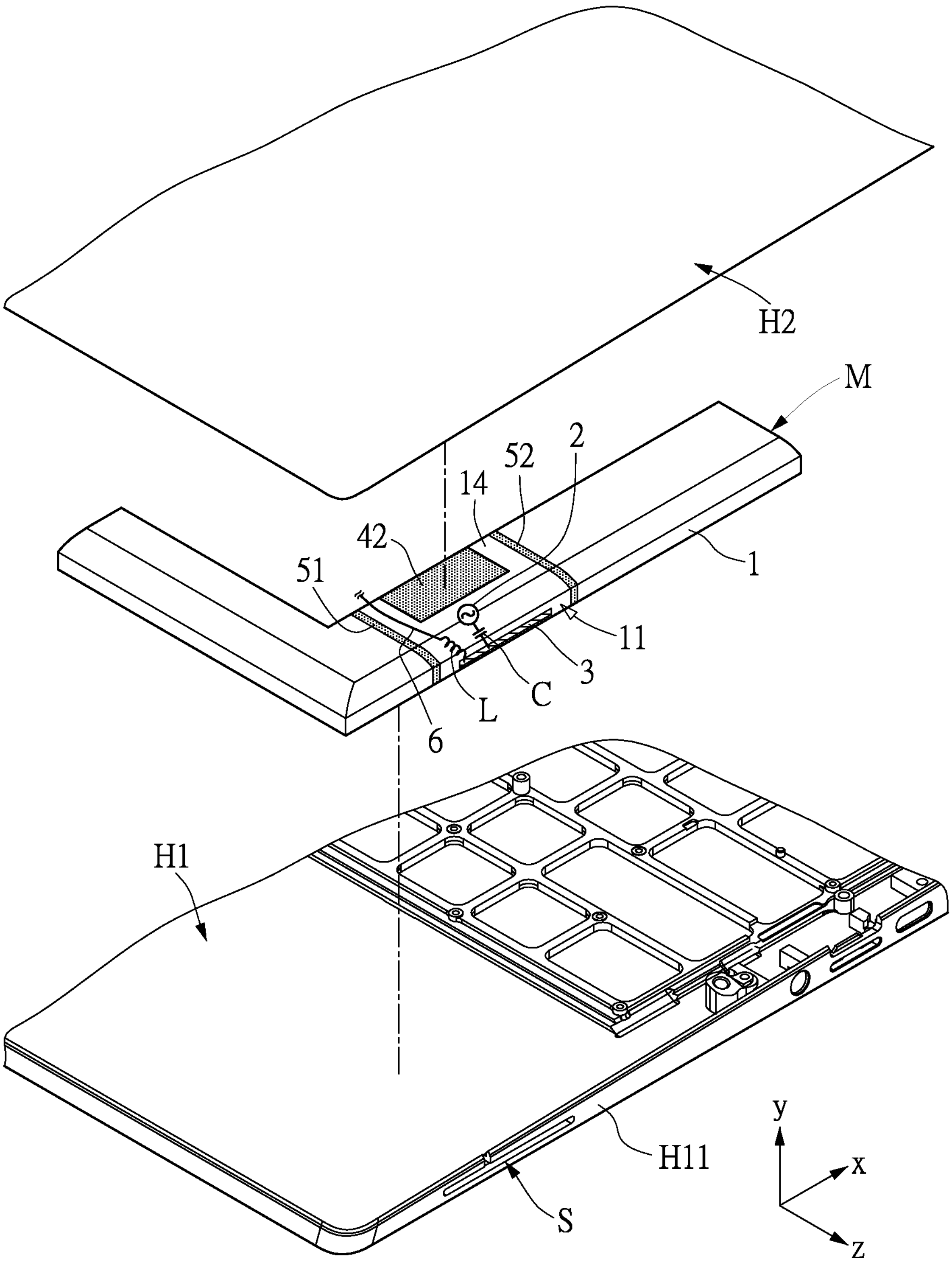
FIG. 3 is a schematic exploded view of the electronic device according to the present disclosure.

Referring to FIG. 2 and FIG. 3, FIG. 3 is a schematic exploded view of the electronic device according to the present disclosure. The metal housing H includes a first housing H1 and a second housing H2. The slot S is disposed at a side frame H11 of the first housing H1. As shown in FIG. 3, the side frame H11 extends upwardly along a positive Y-axis direction. The first housing H1 is referred to as a C part of the notebook computer, and the second housing H2 is referred to as a D part of the notebook computer. It should be noted that, from the perspective of the Y-axis direction shown in FIGS. 1 to 3, FIGS. 2 and 3 are schematic views of the electronic device D in FIG. 1 after being turned over. Therefore, in FIG. 2 and FIG. 3, the second housing H2 is located above the first housing H1. The antenna module M includes a carrier 1, a feeding element 2, a radiating element 3, and a grounding element (a second grounding portion 42 in FIG. 3 is a part of the grounding element). For example, the carrier 1 can be a speaker, but the present disclosure is not limited thereto. The carrier 1 is disposed between the first housing H1 and the second housing H2, and the feeding element 2, the radiating element 3, and the grounding element are disposed on the carrier 1. The feeding element 2 is used to feed a signal. The radiating element 3 is disposed on a surface of the carrier 1 that is adjacent to the slot S, and the radiating element 3 is connected to the feeding element 2.

Figure 4:
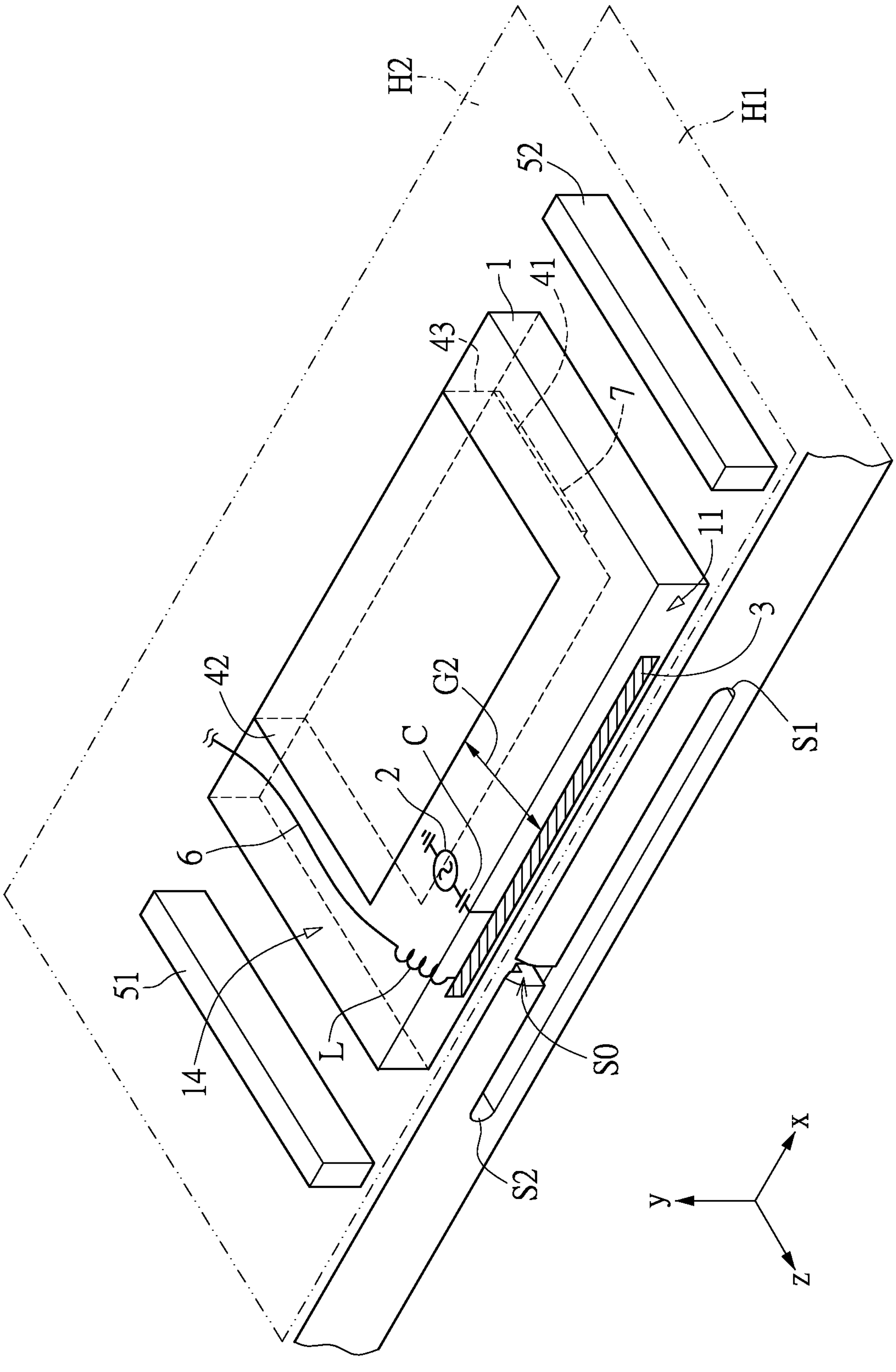
FIG. 4 is a first schematic view of an antenna module according to a first embodiment of the present disclosure.
Figure 5:
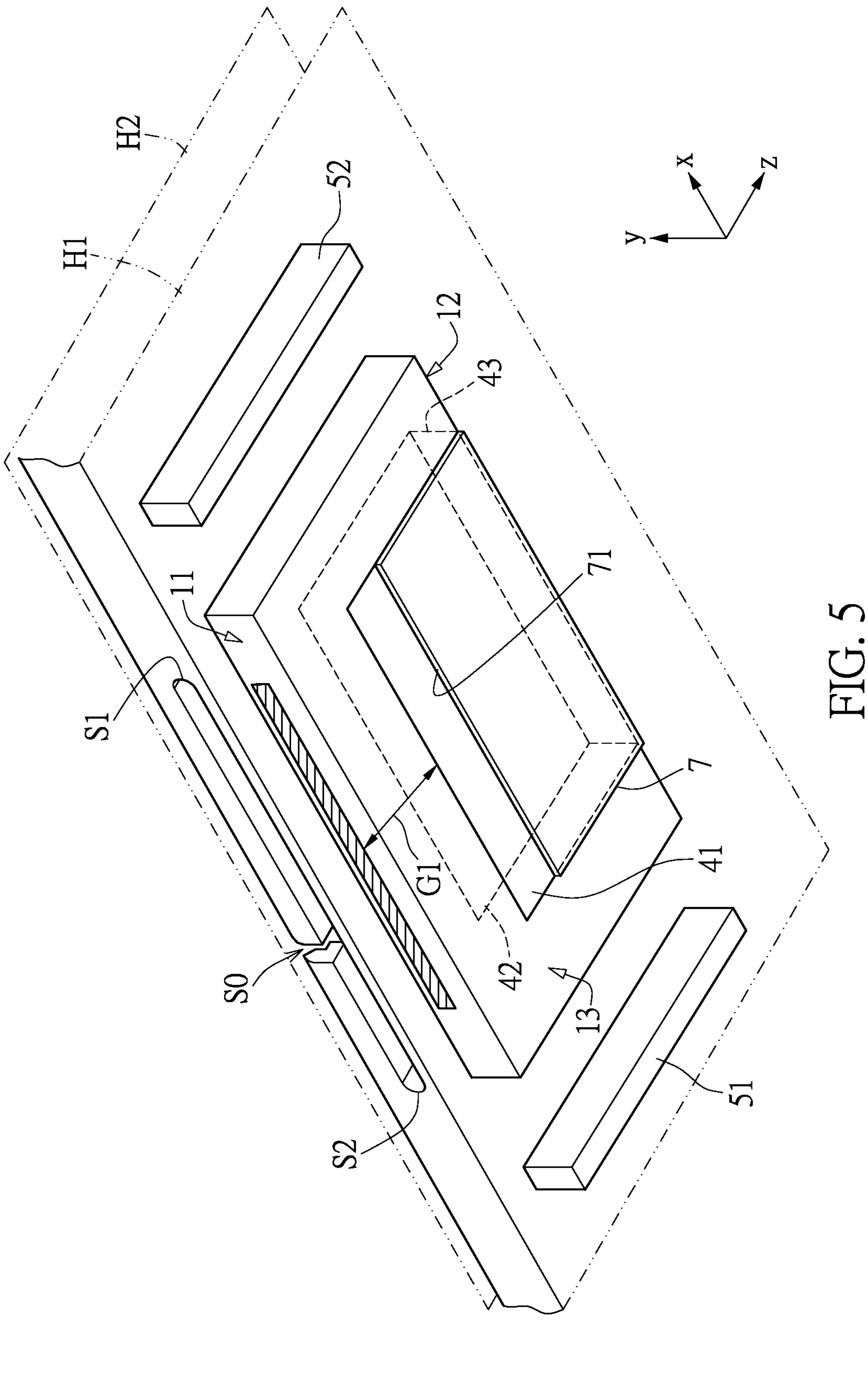
FIG. 5 is a second schematic view of the antenna module according to the first embodiment of the present disclosure.

Referring to FIG. 3 to FIG. 5, FIG. 4 and FIG. 5 are schematic views of an antenna module according to a first embodiment of the present disclosure from different perspectives, and the structure of the slot S is further enlarged in FIG. 4 and FIG. 5. It should be noted that the carrier 1 is an L-shaped three-dimensional structure. For the convenience of description, the carrier 1 in FIG. 4 and FIG. 5 is represented by a simplified structure, but the structure and the shape of the carrier 1 are not limited in the present disclosure. The slot S has an open end S0, a first closed end S1, and a second closed end S2. The open end S0 is located between the first closed end S1 and the second closed end S2, such that the slot S is formed to have a T shape. It is worth mentioning that a window H0 is formed in one part of the second housing H2 adjacent to the slot S, and the window H0 is made of non-metallic materials. Therefore, when the first housing H1 and the second housing H2 are assembled to each other, another part of the second housing H2 made of metal does not cover the open end S0 of the slot S of the first housing H1. That is, the slot S is an open slot structure.

Reference is further made to FIG. 4 and FIG. 5. The carrier 1 has a first surface 11 and a second surface 12 that are opposite to each other, and has a third surface 13 and a fourth surface 14 that are opposite to each other. The third surface 13 and the fourth surface 14 are located between the first surface 11 and the second surface 12. The third surface 13 faces the first housing H1, the fourth surface 14 faces the second housing H2, and the first surface 11 faces the slot S. The radiating element 3 is disposed on the first surface 11. An orthogonal projection of the radiating element 3 that is projected onto the metal housing H at least partially overlaps with the slot S, thereby exciting the structure of the slot S to generate several operating frequency bands.

Specifically, the radiating element 3 is coupled to a part of the slot S between the open end S0 and the first closed end S1 to generate a first operating frequency band and a second operating frequency band. The radiating element 3 is coupled to a part of the slot S between the open end S0 and the second closed end S2 to generate a third operating frequency band. The second operating frequency band is higher than the first operating frequency band, and the third operating frequency band is higher than the first operating frequency band. For example, the first operating frequency band ranges from 1,695 MHz to 2,000 MHz, the second operating frequency band ranges from 3,400 MHz to 3,800 MHz, and the third operating frequency band ranges from 3,300 MHz to 3,400 MHz.

Still referring to FIG. 4 and FIG. 5, the grounding element includes a first grounding portion 41 and a second grounding portion 42, the first grounding portion 41 is disposed on the third surface 13, and the second grounding portion 42 is disposed on the fourth surface 14. The first grounding portion 41 and the second grounding portion 42 are in contact with the first housing H1 and the second housing H2, respectively, and the first grounding portion 41 and the second grounding portion 42 are electrically connected to each other. The radiating element 3 and the first grounding portion 41 are spaced apart from each other by a first coupling gap G1, and the radiating element 3 and the second grounding portion 42 are spaced apart from each other by a second coupling gap G2. It should be noted that the coupling gap (including the first coupling gap G1 and the second coupling gap G2) is a shortest direct distance between the grounding portion and the radiating element 3. That is, the first coupling gap G1 is the shortest direct distance between the radiating element 3 and the first grounding portion 41, and the second coupling gap G2 is the shortest direct distance between the radiating element 3 and the second grounding portion 42. Preferably, the first coupling gap G1 and the second coupling gap G2 are each within a range from 0.05 mm to 10 mm.

Through the configuration of the first coupling gap G1, the radiating element 3 is coupled to the first grounding portion 41 to generate a fourth operating frequency band and a fifth operating frequency band. The fifth operating frequency band is higher than the fourth operating band. For example, the fourth operating frequency band ranges from 2,000 MHz to 2,300 MHz, and the fifth operating frequency band ranges from 4,200 MHz to 4,800 MHz. Through the configuration of the second coupling gap G2, he radiating element 3 is coupled to the second grounding portion 42 to generate a sixth operating frequency band and a seventh operating frequency. The seventh operating frequency band is higher the sixth operating frequency band. For example, the sixth operating frequency band ranges from 2,300 MHz to 2,690 MHz, and the seventh operating frequency band ranges from 4,800 MHz to 5,000 MHz.

Referring to FIG. 3 to FIG. 5, the antenna module M further includes a first metal wall 51 and a second metal wall 52. The first metal wall 51 and a second metal wall 52 are disposed on the carrier 1, and the radiating element 3 and the grounding element are located between the first metal wall 51 and the second metal wall 52. Each of the first metal wall 51 and the second metal wall 52 contacts the first housing H1 and the second housing H2. Therefore, the first housing H1 and the second housing H2 are electrically connected to each other and are both grounded. In other embodiments, both of the first metal wall 51 and the second metal wall 52 are disposed in the metal housing H. In addition, the grounding element, the first metal wall 51, and the second metal wall 52 can, for example, be formed on an inner side of the carrier 1 or the metal housing H (such as the second housing H2) by laser engraving, but ways of forming the grounding element, the first metal wall 51, and the second metal wall 52 are not limited in the present disclosure.

In the first embodiment shown in FIG. 4 and FIG. 5, the grounding element further includes a third grounding portion 43 disposed on the second surface 12 of the carrier 1, and the third grounding portion 43 is connected between the first grounding portion 41 and the second grounding portion 42. The first grounding portion 41 and the second grounding portion 42 are electrically connected to each other through the third grounding portion 43. The first metal wall 51, the second metal wall 52 and the third grounding portion 43 jointly surround the radiating element 3 and the grounding element. Therefore, in the present disclosure, the first metal wall 51, the second metal wall 52, and the third grounding portion 43 can be used to block noises generated by other components inside the electronic device D, so as to reduce the influence of these noises on antenna characteristics. Furthermore, through the first metal wall 51, the second metal wall 52, the third grounding portion 43, and the metal housing H (including the first housing H1 and the second housing H2) being configured to be electrically connected to each other and all grounded, a half-enclosed space can be formed to concentrate radiation energy generated by the coupling of the radiating element 3, the slot S, and the grounding element in the slot S, so as to maintain good antenna characteristics.

Figure 6:
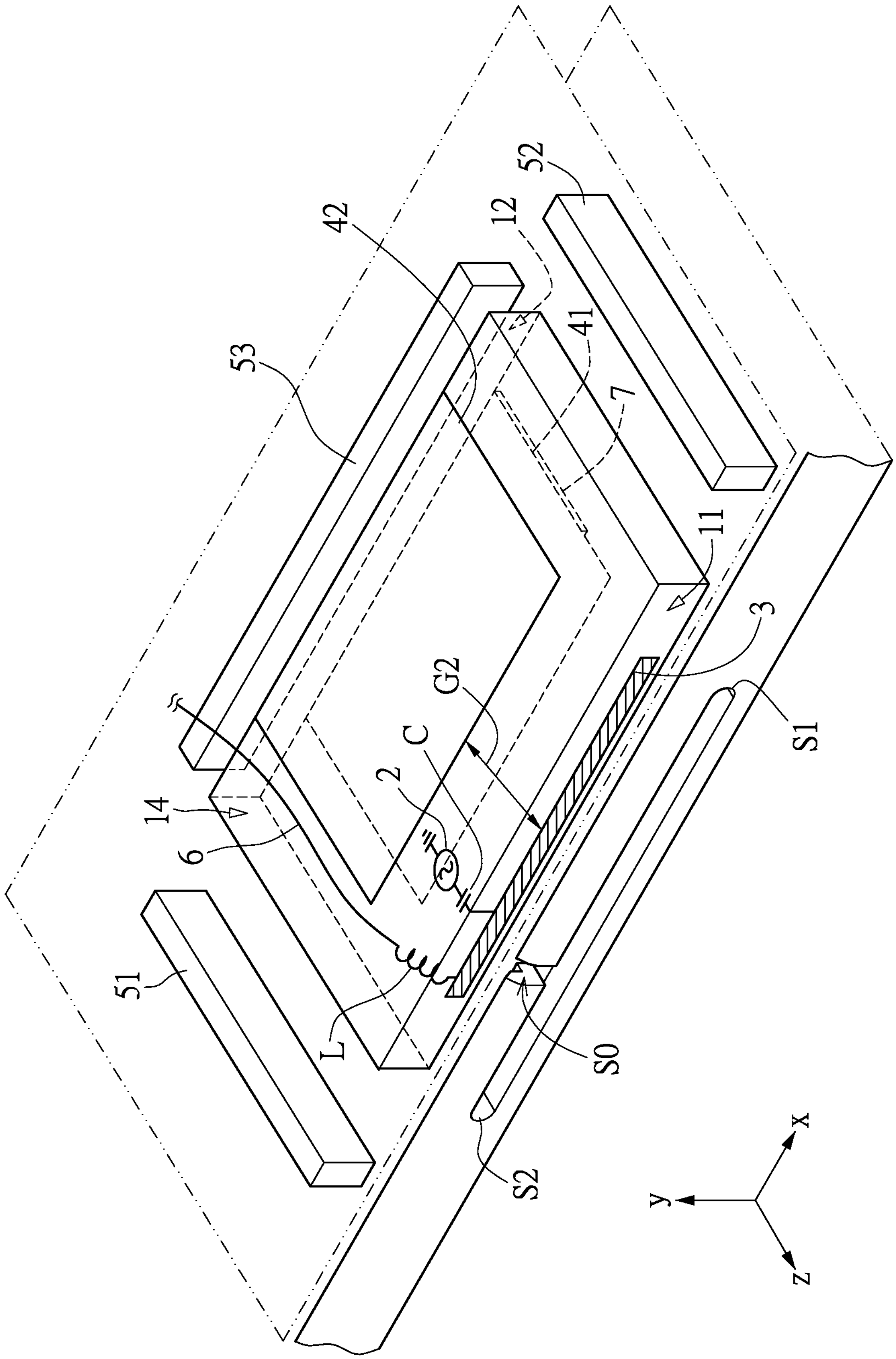
FIG. 6 is a schematic view of the antenna module according to a second embodiment of the present disclosure.

Referring to FIG. 3 and FIG. 6, FIG. 6 is a schematic view of the antenna module according to a second embodiment of the present disclosure. In FIG. 6, the antenna module M further includes a third metal wall 53. The third metal wall 53 is disposed at a side that is adjacent to the second surface 12 of the carrier 1, and the third metal wall 53 contacts both of the first housing H1 and the second housing H2. The first grounding portion 41 and the second grounding portion 42 are electrically connected to each other through the third metal wall 53. Therefore, the antenna module M in FIG. 6 does not have the third grounding portion 43. The third metal wall 53 can be formed on the carrier 1 or the metal housing H by laser engraving. Alternatively, the third metal wall 53 can also be disposed at the side that is adjacent to the second surface 12 of the carrier 1 in the form of a metal sheet.

Therefore, the first metal wall 51, the second metal wall 52, and the third metal wall 53 can jointly surround the radiating element 3 and the grounding element to block the noises generated by other components inside the electronic device D. Furthermore, the first metal wall 51, the second metal wall 52, the third metal wall 53, and the metal housing (including the first housing H1 and the second housing H2) are configured to form the half-enclosed space, so as to concentrate radiation energy generated by the coupling of the radiating element 3 and the grounding element in the slot S. In this way, good antenna characteristics can be maintained.

Referring to FIG. 4 to FIG. 6, the antenna module M further includes a metal bridge element 7. The metal bridge element 7 is disposed between the first grounding portion 41 and the first housing H1. The first grounding portion 41 and the first housing H1 are electrically connected to each other through the metal bridge element 7. It should be noted that a contact area between the metal bridge element 7 and the first grounding portion 41 is smaller than an area of the first grounding portion 41. As shown in FIG. 6, the metal bridge element 7 has a side 71 which is more adjacent to the radiating element 3. A shortest direct distance between the side 71 and the radiating element 3 is greater than the first coupling gap G1, so as to prevent the coupling effect between the radiating element 3 and the first grounding portion 41 from being affected.

According to the above description, when the carrier 1 of the antenna module M is used as a speaker, the metal bridge element 7 can be a metal gasket which can serve as a buffer between the speaker and the first housing H1 to reduce the influence of the vibration of the speaker on the first housing H1. When the carrier 1 of the antenna module M is used as a typical substrate, the metal bridge element 7 can be a metal spring sheet which is electrically connected to the first grounding portion 41 and the first housing H1.

Figure 7:
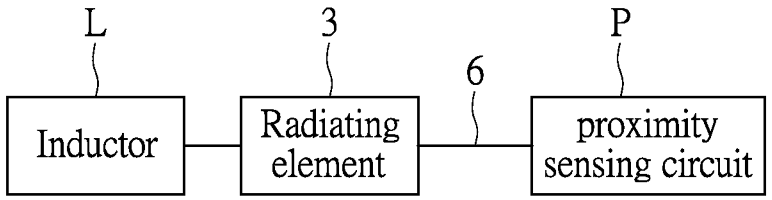
FIG. 7 is a functional block diagram of an inductor, a radiating element, and a proximity sensing circuit of the electronic device according to the present disclosure.

Referring to FIG. 3 and FIG. 7, the antenna module M further includes an inductor L, a capacitor C, and a signal transmission line 6. The capacitor C is connected between the radiating element 3 and the feeding element 2. The inductor L is connected between the radiating element 3 and the signal transmission line 6. One end of the signal transmission line 6 is connected to the inductor L, and another end of the signal transmission line 6 is connected to a proximity sensing circuit P inside the electronic device D. In the present disclosure, the proximity sensing circuit P is electrically connected to the radiating element 3, such that the radiating element 3 serves as a sensing electrode (sensor pad) to sense whether or not a human body is adjacent to the antenna module M, so as to adjust the radiation power of the antenna module M. Accordingly, an issue in which a specific absorption rate (SAR) of a unit mass of an organism to an electromagnetic wave energy is too high can be avoided.

According to the above description, the inductor L can serve as an RF choke to prevent interference between the antenna module M (that includes the radiating element 3 and the feeding element 2) and the proximity sensing circuit P. The capacitor C can serve as a DC block to prevent a DC signal generated by the proximity sensing circuit P from flowing into a system through the radiating element 3 and affecting or damaging other components inside the electronic device D. In addition, the capacitor C can also adjust impedance matching of the antenna module M.

Beneficial Effects of the Embodiments

Figure 8:
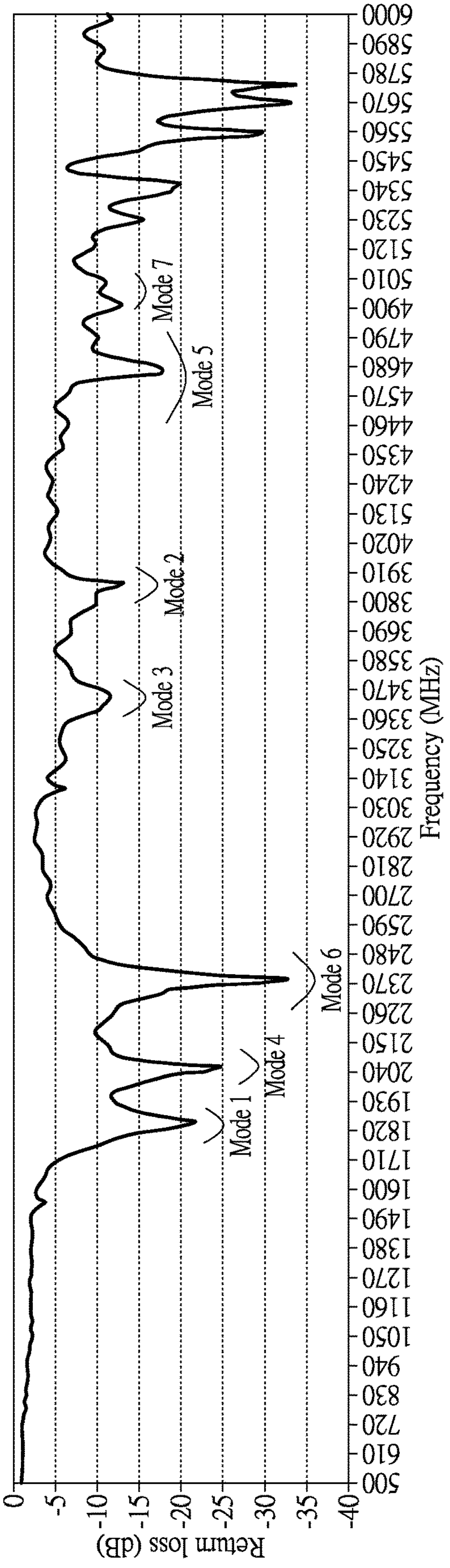
FIG. 8 is a schematic view of a return loss of the antenna module according to the present disclosure.

In conclusion, in the electronic device D and the antenna module M provided by the present disclosure, by virtue of "an orthogonal projection of the radiating element 3 that is projected onto the metal housing H at least partially overlapping with the slot S" and "the first grounding portion 41 and the second grounding portion 42 being electrically connected to each other, the radiating element 3 and the first grounding portion 41 being spaced apart from each other by a first coupling gap G1, and the radiating element 3 and the second grounding portion 42 being spaced apart from each other by a second coupling gap G2," the operating frequency band generated by the antenna module M of the electronic device D can have multi-modal wideband characteristics. Referring to FIG. 8, FIG. 8 is a schematic view of a return loss of the antenna module according to the present disclosure. FIG. 8 shows return loss curves of multi-modes (Mode 1 to Mode 7) generated by the antenna module M. Mode 1 is the first operating frequency band (1,695 MHz to 2,000 MHz), Mode 2 is the second operating frequency band (3,400 MHz to 3,800 MHz), Mode 3 is the third operating frequency band (3,300 MHz to 3,400 MHz), Mode 4 is the fourth operating frequency band (2,000 MHz to 2,300 MHz), Mode 5 is the fifth operating frequency band (4,200 MHz to 4,800 MHz), Mode 6 is the sixth operating frequency band (2,300 MHz to 2,690 MHz), and Mode 7 is the seventh operating frequency band (4,800 MHz to 5,000 MHz).

Moreover, the first metal wall 51, the second metal wall 52, and the third grounding portion 43 (or the third metal wall 53) can block the noises generated by other components inside the electronic device D, so as to reduce the influence of these noises on the antenna characteristics and improve the communication quality. Furthermore, the first metal wall 51, the second metal wall 52, the third grounding portion 43, and the metal housing H (including the first housing H1 and the second housing H2) are configured to concentrate the radiation energy generated by the coupling of the radiating element 3, the slot S, and the grounding element in the slot S, so as to maintain good antenna characteristics.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic device, comprising:

a metal housing having a slot, wherein the slot has an open end;

a carrier disposed in the metal housing, wherein the carrier has a first surface and a second surface that are opposite to each other, and has a third surface and a fourth surface that are opposite to each other; wherein the first surface faces the slot, and the third surface and the fourth surface are located between the first surface and the second surface;

a feeding element disposed in the metal housing and being used to feed a signal;

a radiating element disposed on the first surface, wherein an orthogonal projection of the radiating element that is projected onto the metal housing at least partially overlaps with the slot, and the radiating element is connected to the feeding element; and a grounding element including a first grounding portion and a second grounding portion, wherein the first grounding portion is disposed on the third surface, the second grounding portion is disposed on the fourth surface, the first grounding portion and the second grounding portion are electrically connected to each other, the radiating element and the first grounding portion are spaced apart from each other by a first coupling gap, and the radiating element and the second grounding portion are spaced apart from each other by a second coupling gap.

2. The electronic device according to claim 1, wherein the slot further has a first closed end and a second closed end, and the open end is located between the first closed end and the second closed end, such that the slot is formed to have a T shape.

3. The electronic device according to claim 2, wherein the radiating element is coupled to a part of the slot between the open end and the first closed end to generate a first operating frequency band and a second operating frequency band, and the radiating element is coupled to a part of the slot between the open end and the second closed end to generate a third operating frequency band; wherein the second operating frequency band is higher than the first operating frequency band, and the third operating frequency band is higher than the first operating frequency band.

4. The electronic device according to claim 3, wherein the radiating element is coupled to the first grounding portion to generate a fourth operating frequency band and a fifth operating frequency band, and the fifth operating frequency band is higher than the fourth operating frequency band; wherein the radiating element is coupled to the second grounding portion to generate a sixth operating frequency band and a seventh operating frequency band, and the seventh operating frequency band is higher than the sixth operating frequency band.

5. The electronic device according to claim 1, further comprising a first metal wall and a second metal wall, wherein the first metal wall and the second metal wall are disposed on the metal housing or the carrier, and the radiating element and the grounding element are located between the first metal wall and the second metal wall; wherein the metal housing includes a first housing and a second housing, and the first housing and the second housing are electrically connected to each other and are both grounded.

6. The electronic device according to claim 5, further comprising a third metal wall, wherein the third metal wall is disposed at a side that is adjacent to the second surface of the carrier, and the first metal wall, the second metal wall and the third metal wall jointly surround the radiating element and the grounding element.

7. The electronic device according to claim 5, wherein the grounding element further includes a third grounding portion disposed on the second surface of the carrier, and the third grounding portion is connected between the first grounding portion and the second grounding portion.

8. The electronic device according to claim 1, wherein the first coupling gap and the second coupling gap are each within a range from 0.05 mm to 10 mm.

9. The electronic device according to claim 1, further comprising an inductor, a capacitor, a signal transmission line and a proximity sensing circuit, wherein the capacitor is connected between the radiating element and the feeding element, the inductor is connected between the radiating element and the signal transmission line, one end of the signal transmission line is connected to the inductor, and another end of the signal transmission line is connected to the proximity sensing circuit.

10. An antenna module disposed in a metal housing having a slot, the slot having an open end, a first closed end and a second closed end, and the open end being located between the first closed end and the second closed end, the antenna module comprising:

a carrier disposed in the metal housing, wherein the carrier has a first surface and a second surface that are opposite to each other, and has a third surface and a fourth surface that are opposite to each other; wherein the first surface faces the slot, and the third surface and the fourth surface are located between the first surface and the second surface;

a radiating element disposed on the first surface, wherein an orthogonal projection of the radiating element that is projected onto the metal housing at least partially overlaps with the slot; wherein the radiating element is connected to a feeding element, and a signal is fed into the radiating element through the feeding element; and a grounding element including a first grounding portion and a second grounding portion, wherein the first grounding portion is disposed on the third surface, the second grounding portion is disposed on the fourth surface, the first grounding portion and the second grounding portion are electrically connected to each other, the radiating element and the first grounding portion are spaced apart from each other by a first coupling gap, and the radiating element and the second grounding portion are spaced apart from each other by a second coupling gap.

11. The antenna module according to claim 10, wherein the radiating element is coupled to a part of the slot between the open end and the first closed end to generate a first operating frequency band and a second operating frequency band, and the radiating element is coupled to a part of the slot between the open end and the second closed end to generate a third operating frequency band; wherein the second operating frequency band is higher than the first operating frequency band, and the third operating frequency band is higher than the first operating frequency band.

12. The antenna module according to claim 11, wherein the radiating element is coupled to the first grounding portion to generate a fourth operating frequency band and a fifth operating frequency band, and the fifth operating frequency band is higher than the fourth operating frequency band; wherein the radiating element is coupled to the second grounding portion to generate a sixth operating frequency band and a seventh operating frequency band, and the seventh operating frequency band is higher than the sixth operating frequency band.

13. The antenna module according to claim 10, further comprising a first metal wall and a second metal wall, wherein the first metal wall and the second metal wall are disposed on the carrier, and the radiating element and the grounding element are located between the first metal wall and the second metal wall; wherein the metal housing includes a first housing and a second housing, and the first housing and the second housing are electrically connected to each other and are both grounded.

14. The antenna module according to claim 13, further comprising a third metal wall, wherein the third metal wall is disposed at a side that is adjacent to the second surface of the carrier, and the first metal wall, the second metal wall and the third metal wall jointly surround the radiating element and the grounding element.

15. The antenna module according to claim 13, wherein the grounding element further includes a third grounding portion disposed on the second surface of the carrier, and the third grounding portion is connected between the first grounding portion and the second grounding portion.

16. The antenna module according to claim 10, wherein the first coupling gap and the second coupling gap are each within a range from 0.05 mm to 10 mm.

17. The antenna module according to claim 10, further comprising an inductor, a capacitor and a signal transmission line, wherein the capacitor is connected between the radiating element and the feeding element, the inductor is connected between the radiating element and the signal transmission line, one end of the signal transmission line is connected to the inductor, and another end of the signal transmission line is connected to a proximity sensing circuit.

* * * * *